United States Patent
Thorson et al.

(10) Patent No.: US 7,123,923 B2
(45) Date of Patent: Oct. 17, 2006

(54) METHOD AND APPARATUS FOR CALL SETUP

(75) Inventors: Dean E. Thorson, Grayslake, IL (US); John M. Harris, Chicago, IL (US); Sean S. Kelley, Hoffman Estates, IL (US); Daniel J. DeClerck, Lake Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/813,478

(22) Filed: Mar. 30, 2004

(65) Prior Publication Data

US 2005/0221835 A1    Oct. 6, 2005

(51) Int. Cl.
*H04B 7/15* (2006.01)

(52) U.S. Cl. .............. 455/452.2; 455/445; 455/450; 370/329

(58) Field of Classification Search .......... 455/437, 455/438, 452.2, 435.2, 436, 403, 414.1, 422.1, 455/458, 450, 439, 452.1, 445; 370/329, 370/330, 331
See application file for complete search history.

(56) References Cited

U.S. PATENT DOCUMENTS

| | | | | | |
|---|---|---|---|---|---|
| 5,659,879 | A | * | 8/1997 | Dupuy | 455/15 |
| 5,787,346 | A | * | 7/1998 | Iseyama | 455/439 |
| 5,924,042 | A | * | 7/1999 | Sakamoto et al. | 455/458 |
| 6,064,890 | A | * | 5/2000 | Hirose et al. | 455/513 |
| 6,167,036 | A | | 12/2000 | Beven | |
| 6,493,561 | B1 | * | 12/2002 | Hasegawa | 455/512 |
| 6,760,594 | B1 | * | 7/2004 | Murasawa et al. | 455/512 |
| 6,865,398 | B1 | * | 3/2005 | Mangal et al. | 455/552.1 |
| 2001/0005359 | A1 | * | 6/2001 | Bergqvist | 370/230 |
| 2002/0128013 | A1 | * | 9/2002 | Declerck et al. | 455/436 |
| 2004/0203422 | A1 | * | 10/2004 | Srey et al. | 455/67.11 |
| 2004/0224705 | A1 | * | 11/2004 | Nishimura | 455/466 |

* cited by examiner

*Primary Examiner*—CongVan Tran
(74) *Attorney, Agent, or Firm*—Kenneth A. Haas; Steven A. May

(57) ABSTRACT

Channel assignment is performed by utilizing a base station controller (BSC) or a base station depending upon a mobile unit's RF environment and/or the type of call being made. By performing call setup in this manner, mobiles that access with no soft handoff requirement (approximately 50% of mobile in IS-2000 systems) will have faster setup times.

20 Claims, 4 Drawing Sheets

100

300

METHOD AND APPARATUS FOR CALL SETUP

FIELD OF THE INVENTION

The present invention relates generally to call setup, and in particular, to a method and apparatus for call setup of both mobile-originated and mobile-terminated calls within a communication system.

BACKGROUND OF THE INVENTION

Push-to-talk (PTT) services are becoming more popular with cellular consumers. Standard PTT services utilize an individual's cellular telephone to place a call to another cellular telephone by pressing a single button. For such a walkie-talkie like feature to be accepted by consumers, the time between when an individual pushes the button, and when the call is connected, must be small. Therefore, it becomes essential to have a fast call setup time for cellular systems offering PTT services. Current technology in a communication system employing the Code Division, Multiple Access (CDMA) system protocol requires around 600 milliseconds for a PTT call to be set up. Reducing this time is desirable. Therefore a need exists for a method and apparatus for call setup that minimizes the amount of time necessary to establish the call.

DETAILED DESCRIPTION OF THE DRAWINGS

To address the above-mentioned need channel assignment is performed by utilizing either a base station controller (BSC) or a base station depending upon certain circumstances. In particular, a determination to perform channel assignment at a BSC will be made based on the mobile unit's RF environment and/or the type of call being made. By performing call setup in this manner, mobiles that access with no soft handoff requirement (approximately 50% of mobile in IS-2000 systems) will have faster setup times.

The present invention encompasses a method for call setup. The method comprises the steps of receiving a call-setup request from a mobile unit, determining RF conditions from the call setup request, and determining whether to utilize either a Base Station Controller (BSC) or a base station for channel assignment based on the RF conditions. A channel is then assigned to the mobile unit at either the BSC or the base station based on the determinations.

The present invention additionally encompasses a method comprising the steps of receiving a request from a mobile unit to set up a call, receiving RF conditions from the request, and receiving a type of call to be set up from the request. A determination is made whether to utilize either a BSC or a base station for channel assignment based on the RF conditions and the type of call to be set up. Finally, a channel is assigned to the mobile unit via either the BSC or the base station based on the determination.

The present invention additionally encompasses an apparatus comprising means for receiving a request from a mobile unit to set up a call, means for receiving RF conditions from the request, means for receiving a type of call to be set up from the request, means for determining whether to utilize either a BSC or a base station for channel assignment based on the RF conditions and the type of call to be set up, and means for assigning a channel to the mobile unit via either the BSC or the base station based on the determination.

Figure 1:
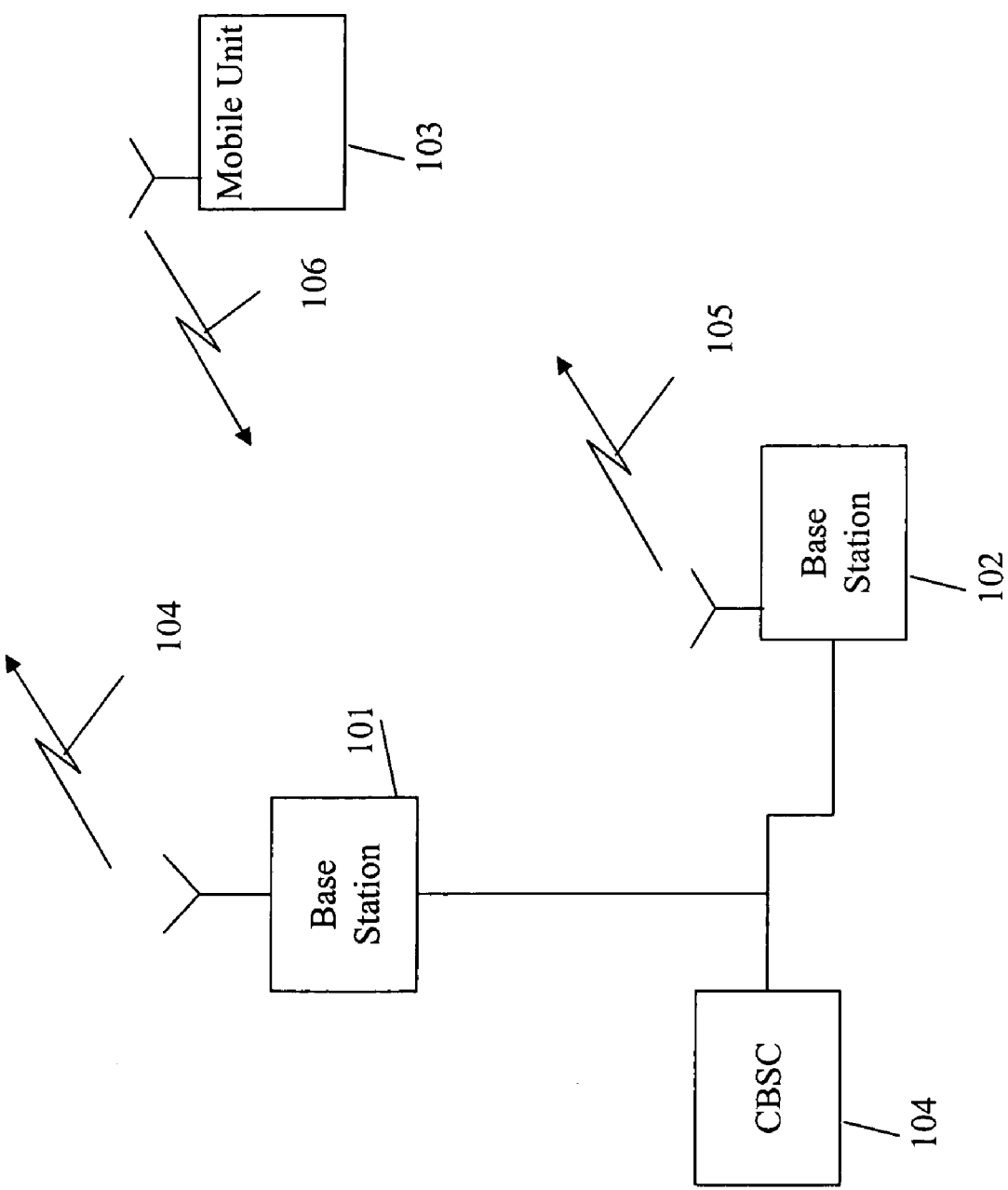
FIG. 1 is a block diagram of a communication system.

Turning now to the drawings, where like numerals designate like components, FIG. 1 is a block diagram of communication system 100. Communication system 100 utilizes a Code Division Multiple Access (CDMA) system protocol as described in Cellular System Mobile unit-Base Station Compatibility Standard of the Electronic Industry Association/Telecommunications Industry Association Interim Standard 2000 (TIA/EIA/IS-2000), which is incorporated by reference herein. (EIA/TIA can be contacted at 2001 Pennsylvania Ave. NW Washington D.C. 20006). However, in alternate embodiments communication system 100 may utilize other digital cellular communication system protocols such as, but not limited to, the next generation CDMA architecture as described in the UMTS protocol, the cdma2000 system protocol, the next generation Global System for Mobile Communications (GSM) protocol, . . . , etc.

Communication system 100 includes a number of network elements such as base station 101, base station 102, mobile unit 103, and Base Station Controller (BSC) 104. As shown, mobile unit 103 is communicating with base station 101 and 102 via uplink communication signal 106 and base stations 101 and 102 are communicating with mobile unit 103 via downlink communication signals 104 and 105, respectively. It should be noted that although only two base stations are shown in FIG. 1, one of ordinary skill in the art will recognize that communication system 100 typically comprises many base stations in communication with many BSCs. Additionally, as one of ordinary skill in the art will appreciate, each base station within communication system 100 comprises a plurality of transceivers arranged in "sectors". In the preferred embodiment of the present invention, base stations 101 and 102 are suitably coupled to BSC 104. It is contemplated that network elements within communication system 100 are configured in well known manners with processors, memories, instruction sets, and the like, which function in any suitable manner to perform the function set forth herein.

Communication system 100 is capable of setting up a call in simultaneous communication (soft handoff) with several base stations, or base station sectors. Setting up a call in soft handoff helps improve communication when mobile unit 103 is in a poor radio-frequency RF environment. Because call setup with several base stations/sectors requires coordinated channel assignment among the base stations/sectors, BSC 104 will need to communicate with the base stations to properly assign the channels among base stations in soft handoff with the accessing mobile unit. This requires any access request to be routed to BSC 104 for channel assignment. Unfortunately, performing channel assignment at BSC 104 also adds appreciable time to the call-setup procedure.

In order to address this issue, in the preferred embodiment of the present invention channel assignment is performed at BSC 104 only under certain circumstances. In particular, a determination to perform channel assignment at BSC 104 will be made based on the mobile unit's RF environment. In alternate embodiments of the present invention, the decision to perform channel assignment at BSC 104 will be based on other criteria such as the type of call being made.

Because performing call setup at BSC 104 adds appreciable delay to the call-setup procedure, when mobile unit 103 experiences good RF conditions, channel assignment will not be performed at BSC 104 since there is little need for the call to be setup in soft-handoff. Additionally, when it is determined that the access request is for a PTT call to be set up, channel assignment will not be performed at BSC 104 because of the need for reduced call setup time.

Figure 2:
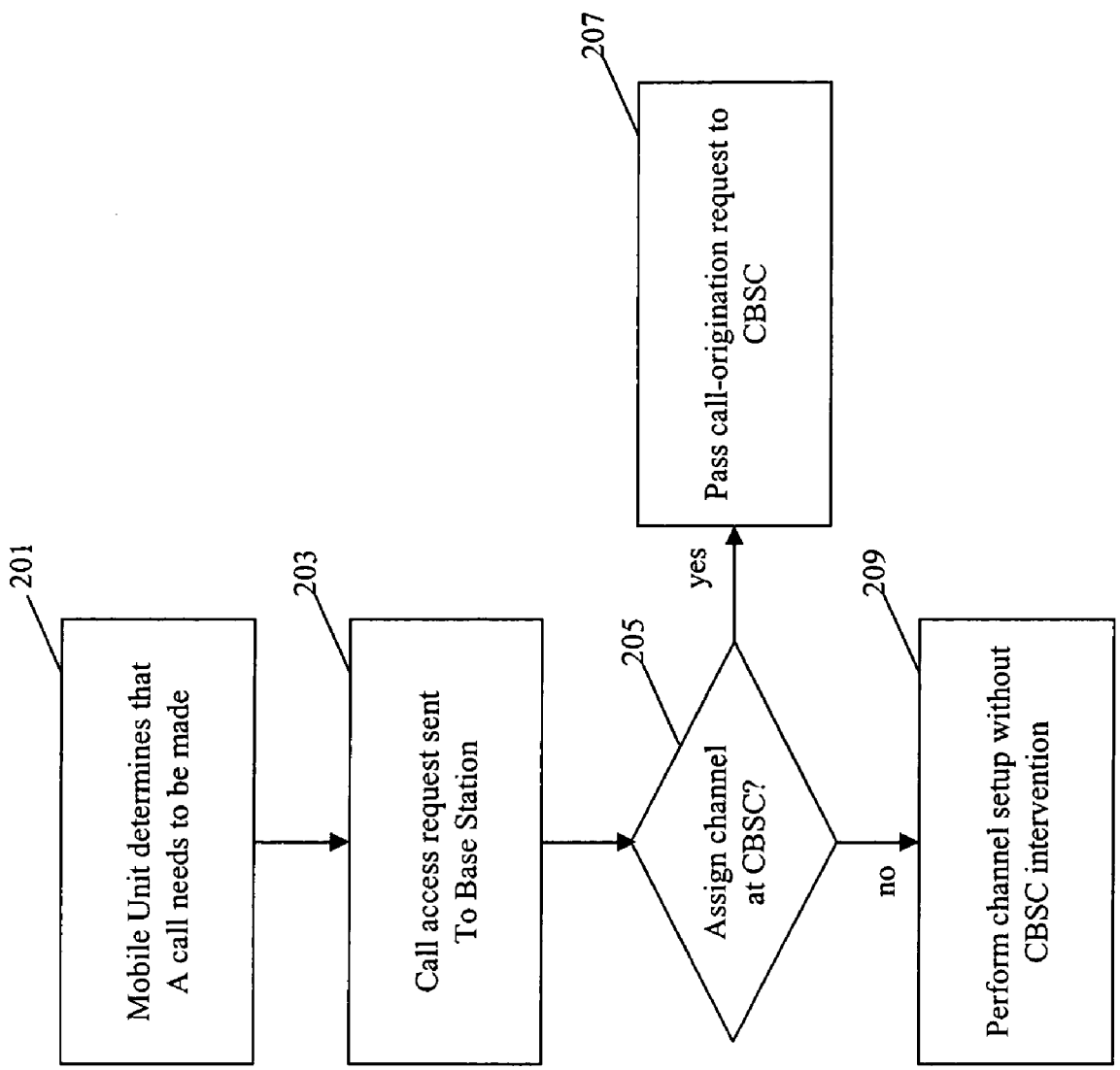
FIG. 2 is a flow chart showing operation of the communication system of FIG. 1.

FIG. 2 is a flow chart showing operation of the communication system of FIG. 1. The logic flow begins at step 201 where mobile unit 103 determines that a call needs to be made. At step 203 an access request is sent to a base station having a best signal strength. In the preferred embodiment of the present invention the access request is sent to a base station having a best pilot channel signal strength divided by the incident noise ($Ec/I_o$). As part of the access request, mobile unit 103 includes measurements of $Ec/I_o$ for all base stations with $Ec/I_o$ above a threshold (T_ADD). Thus, the base station having the best $Ec/I_o$ will receive an access request comprising $Ec/I_o$ values for all base stations above T_ADD.

Once the access request is received by the base station, a determination is made whether or not to perform channel assignment at BSC 104 (step 205). As discussed above, the determination is made based on the type of call being set up along with the mobile unit's measurement of the forward link RF environment. In particular, if it is determined that the access request is for a PTT call, then the channel assignment is performed at the base station only when the mobile reports the base station's $Ec/I_o$ above a threshold (i.e. IS_2000 T_ADD threshold). If, however it is determined that the access request is for a call other than a PTT call and the mobile reports more than one pilot measurement in it's access request, then the channel assignment is performed at BSC 104. Thus, non-PTT call requests are routed to BSC 104 under better RF conditions than for PTT call requests. This is because the need for quick call setup outweighs the benefits for call setup in soft-handoff for all but the worst RF conditions.

Continuing, if at step 205 it is determined that channel assignment is to be performed at BSC 104, then the logic flow continues to step 207 where the access request is passed to BSC 104 where normal channel assignment and call setup procedures take place. On the other hand, if at step 205 it is determined that channel assignment is not to be performed at BSC 104, then the logic flow continues to step 209 where channel assignment is controlled by the base station and the access request is passed to BSC 104 with an indication that channel assignment is being performed by the base station.

As is evident, the above procedure will set up calls at the base station for:

All PTT calls where the base station receiving the access request has a signal strength above a threshold (i.e. T_ADD); and All non-PTT calls reporting only a single base station in its access request.

By performing call setup as described above, mobiles that access with no soft handoff requirement (approximately 50% of mobile in IS-2000 systems) will have faster setup times. Since involving BSC 104 in channel assignment requires around 5% of the total call-setup time, performing channel assignment at the base station will result in a 5% decrease in call-setup time for 50% of mobile units in an IS-2000 communication system.

It should be noted that performing channel assignment at the base station will result in a channel resource being assigned to mobile unit 103 without the knowledge of BSC 104. In certain circumstances BSC 104 may assign the same channel resource to another mobile unit. In order to avoid this situation several techniques may be employed by communication system 100. In a first embodiment of the present invention, all base stations within communication system 100 will be allocated a pool of channel resources that are reserved for base-station-controlled channel assignments. This will prevent BSC 104 from assigning any channel resources that are also being assigned by base stations within communication system 100. In a second embodiment of the present invention, the pool of channels will not exist. BSC 104 will, however, be made aware of all channel resources being assigned by base stations assigning the channels. This will be accomplished via messaging between BSC 104 and the base stations.

Figure 3:
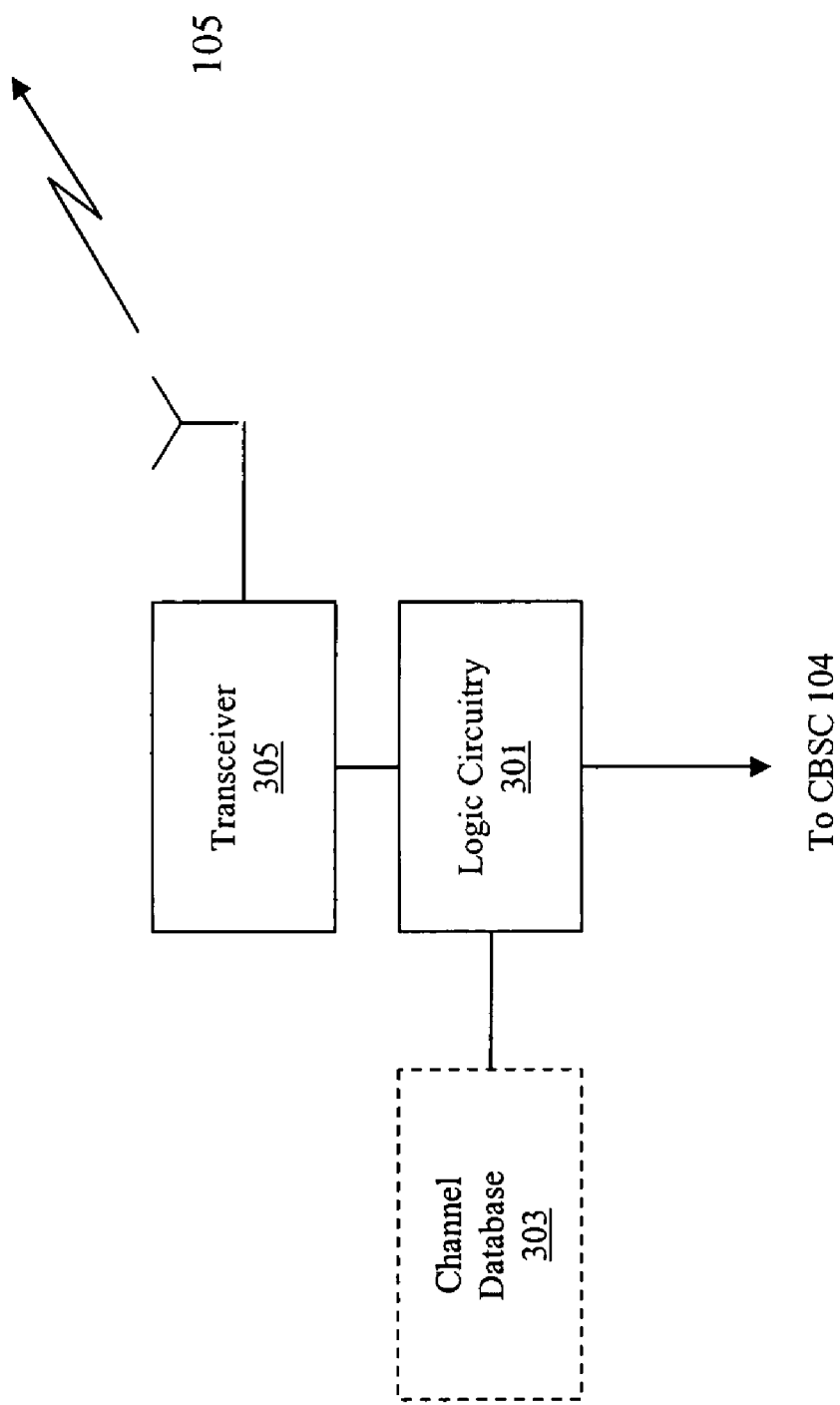
FIG. 3 is a block diagram of a base station.

FIG. 3 is a block diagram of base station 300 within communication system 100. As shown, base station 300 comprises logic circuitry 301, optional channel database 303, and transceiver 305. Transceiver 305 serves as means for receiving call requests containing RF conditions and a type of call to be set up. Logic circuitry 301 serves as means for determining whether to utilize either a BSC or a base station for channel assignment, and then assigning the channel when the base station is utilized.

As discussed above, optional channel database 303 holds a reserved pool of channel resources utilized by base station 300 when channel assignment is being performed at the base station. Database 303 is optional in that in an alternate embodiment of the present invention, the pool is not utilized. In this situation BSC 104 is be made aware of channels being assigned by base station 300 via messaging between BSC 104 and base station 300.

Figure 4:
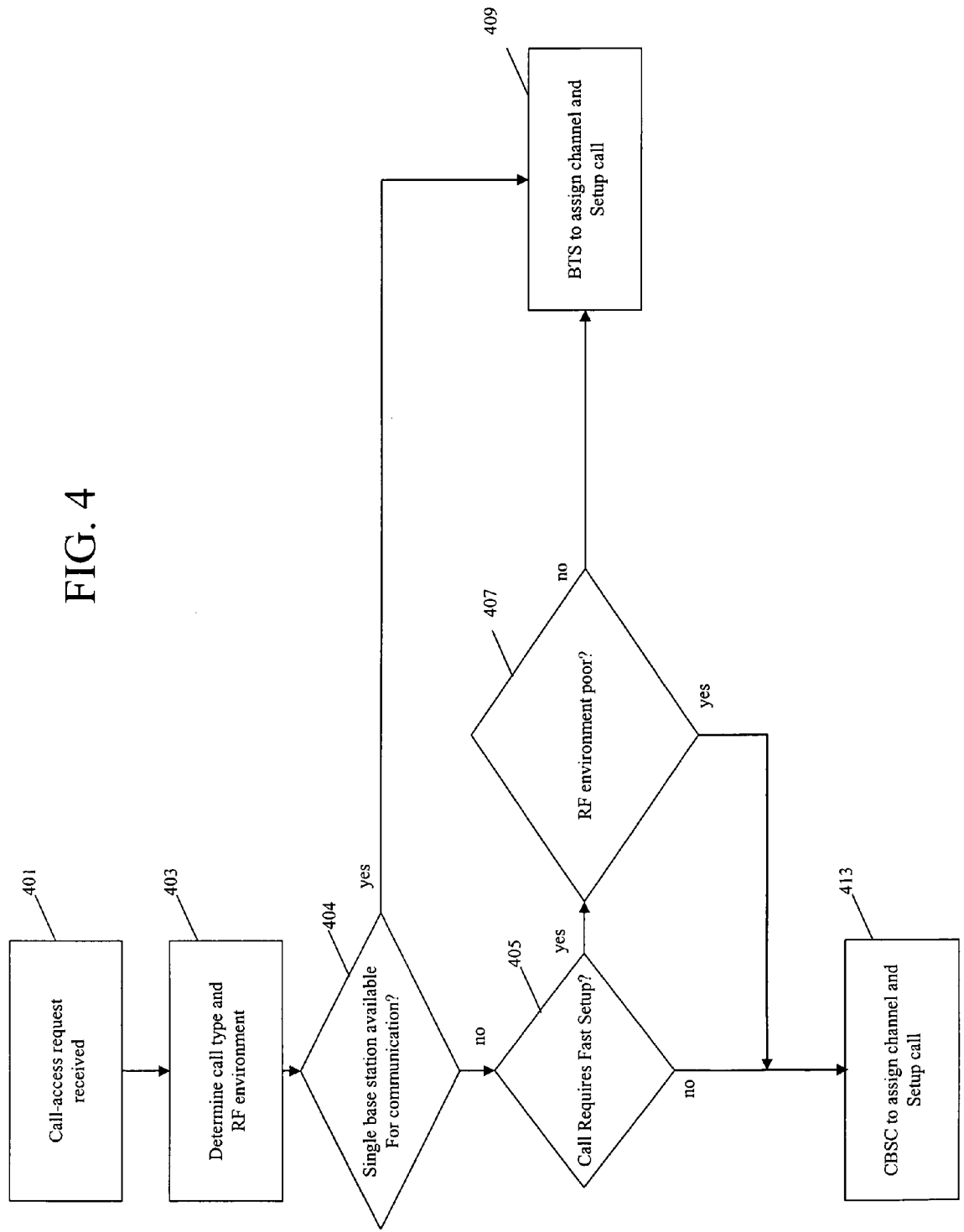
FIG. 4 is a flow chart showing operation of the base station of FIG. 3.

Base station 300 determines whether to utilize either BSC 104 or base station 300 during channel assignment. The determination is based on both the RF conditions and the type of call being set up. As discussed above, base station 300 will channel assign all calls for PTT call requests, as long as the Radio Environment Record appended to the access request indicates that base station 300 has a signal strength above T_ADD. Thus, irrespective of how many base stations have signal strength measurements above T_ADD, all PTT calls are assigned using only a single base station. Base station 300 also channel assigns all calls (PTT and non-PTT) when the mobile unit reports that only a single base station is available for communication. Thus, if more than one base station is available for communication, then only PTT calls are channel assigned utilizing a single base station, and other calls will be channel assigned using BSC 104. FIG. 4 is a logic flow diagram detailing these steps.

The logic flow begins at step 401 where logic circuitry 301 receives an access, or call-setup request from mobile unit 103. As one of ordinary skill in the art will recognize, in a communication system utilizing the IS 2000 system protocol, the access request typically comprises an IS 2000 Origination Message, an IS 2000 Page Response Message, or an IS 2000 Reconnect Message received via an access channel (not shown). Once the access request is received, logic circuitry 301 determines the type of call to be set up, along with the RF conditions. Both the call type and the RF conditions are received from the Radio Environment Record appended to the access, or set-up request (step 403). In the preferred embodiment of the present invention the RF conditions comprise a number of base stations that the mobile unit can communicate with, or a number of base stations having their signal strength above T_ADD. However in alternate embodiments of the present invention, other forms of RF conditions may be utilized. Additionally, in the preferred embodiment of the present invention the type of call comprises either a PTT call, or a standard interconnect call, however, in alternate embodiments of the present invention the type of call may comprise other call types such as data calls, pages, . . . , etc.

All access attempts reporting possible communication with only a single base station are channel assigned without utilizing BSC 104. Thus, at step 404 logic circuitry 301 determines if the reported Radio Environment Record exclusively contains an identifier of base station 300, and no other base stations. If so, the logic flow continues to step 409 where base station 300 assigns a channel to the mobile. The access request is eventually passed to BSC 104 with an indication that channel assignment is being performed by the base station. BSC 104 will then transfer control of additional RF resources to base station 300 to replace the resource that the base station has allocated.

Continuing, if it is determined at step 404 that a Radio Environment Record contains more than one base station identifier, (or more than one base station identifier with a signal strength greater than some threshold), then the logic flow continues to step 405 where logic circuitry 301 determines if the call is a call requiring a quick setup time (e.g., a PTT call). If, it is determined at step 405 that the call requires a quick setup time, the logic flow continues to step 407, otherwise the logic flow continues to step 413 where BSC 104 is utilized for channel assignment.

At step 407 logic circuitry 301 determines if the reported number of pilots for the mobile unit (or the number of pilots with a signal strength greater than some threshold) is below a second threshold or if there is a dominant pilot (a pilot to signal strength is significantly higher than that of the other pilots). As discussed above, there may exist access/call setup requests with such poor RF environment that the call may need to be setup in soft handoff regardless of the call type. If this is the case, then the logic flow continues to step 413 where BSC 104 is passed the access/call setup request to set up the call.

In the preferred embodiment of the present invention, roughly one call worth of RF resources will be cached at base station 300 at any given time. In general, it is most resource efficient to manage resources at a single location. Thus, when overall system resources (i.e., channels) become scarce (system loading becomes high), BSC 104 will recall cached resources from base station 300 to BSC 104. This will result in specific messages across the backhaul link. Specifically, there will be a message from BSC 104 indicating to base station 300 the amount of resources which BSC 104 wishes to recall. Additionally, there will be a message from base station 300 to BSC 104 requesting BSC 104 to cache a given amount of resources at base station 300. The following messages are passed between base station 300 and BSC 104:

BSC volunteering specific resources to base station 300 for base station 300 to cache;

BSC 104 requesting additional resources be reverted to BSC 104;

base station 300 requesting a specific amount of additional resources to be cached at base station 300;

base station 300 informing BSC 104 when base station 300 has performed an autonomous assignment; and base station 300 informing BSC 104 when base station 300 has performed autonomous assignment for a call which likely needs to be channel assigned into soft handoff, but was not channel assigned into soft handoff in the interests of reducing latency. In this way BSC 104 can be triggered to prepare itself to send a handoff direction message to the mobile across a traffic channel once it completes tuning to the traffic channel.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for call setup, the method comprising the steps of:
   receiving a call-setup request from a mobile unit;
   determining RF conditions from the call setup request;
   determining whether to utilize either a Base Station Controller (BSC) or a base station for channel assignment based on the RF conditions; and
   assigning a channel to the mobile unit by either the BSC or the base station based on the determination.

2. The method of claim 1 further comprising the steps of:
   determining a type of call to be setup; and
   wherein the determination on whether to utilize the BSC or the base station for channel assignment is additionally based on the type of call to be setup.

3. The method of claim 1 wherein the step of determining RF conditions comprises the step of determining RF conditions from RF conditions reported in the call-setup request.

4. The method of claim 1 wherein the step of determining RF conditions comprises the step of determining whether the base station receiving the call setup request is sufficient to support reliable communication with the mobile unit and wherein the step of determining whether to utilize either a Base Station Controller or a base station for channel assignment comprises the step of utilizing the base station for channel assignment when the base station receiving the call setup request is sufficient to support reliable communication with the mobile unit.

5. The method of claim 1 further comprising the step of:
   determining if the call setup request is for a Push-to-Talk (PTT) call; and
   wherein the determination on whether to utilize the BSC or the base station for channel assignment is additionally based on if the call setup request is for a PTT call.

6. The method of claim 1 wherein the step of receiving the call-setup request comprises the step of receiving one of an IS2000 Origination Message, an IS2000 Page Response Message, or an IS2000 Reconnect Message.

7. The meted of claim 1 wherein the step of determining RF conditions from the call setup request comprises the step of determining a number of base stations capable of communicating with the mobile unit; and
   wherein the step of determining whether to utilize either the Base Station Controller (BSC) or the base station for channel assignment comprises the step of utilizing the base station for channel assignment when only a single base station is capable of communicating with the mobile unit.

8. The method of claim 1 wherein the step of assigning the channel to the mobile unit comprises the step of assigning the channel from a pool of reserved channels utilized by the base station.

9. A method for call setup comprising the steps of:
   receiving a request from a mobile unit to set up a call;
   receiving RF conditions front the request;
   receiving a type of call to be set up from the request;

determining whether to utilize either a BSC or a base station for channel assignment based on the RF conditions and the type of call to be setup; and assigning a channel to the mobile unit via either the BSC or the base station based on the determination.

10. The method of claim 9 further comprising determining whether the base station receiving the call setup request is sufficient to support reliable communication with the mobile unit and wherein the step of determining whether to utilize either a Base Station Controller or a base station for channel assignment comprises the step of utilizing the base station for channel assignment when the base station receiving the call setup request is sufficient to support reliable communication with the mobile unit.

11. The method of claim 9 wherein the step of receiving the type of call to be set up comprises the step of receiving a request to set up a PTT call.

12. The method of claim 9 wherein the step of receiving the type of call to be set up comprises the step of receiving a request to set up a standard interconnect call.

13. The method of claim 9 wherein the step of receiving the request comprises the step of receiving one of an IS2000 Origination Message, an IS2000 Page Response Message, or an IS2000 Reconnect Message.

14. The method of claim 9 wherein the step of receiving RF conditions from the request comprises the step of determining a number of base stations capable of communicating with the mobile unit; and wherein the step of determining whether to utilize either the BSC or the base station for channel assignment comprises the step of utilizing the base station for channel assignment when only a single base station is capable of communicating with the mobile unit.

15. The method of claim 9 wherein the step of determining whether to utilize either the BSC or the base station for channel assignment comprises the step of determining whether to utilize either the BSC or the base station for channel assignment based on the RF conditions and whether or not the call to be set up is a PTT call.

16. An apparatus comprising:

means for receiving a request from a mobile unit to set up a call;

means for receiving RF conditions from the request;

means for receiving a type of call to be set up from the request;

means for determining whether to utilize either a BSC or a base station for channel assignment based on the RF conditions and the type of call to be set up; and means for assigning a channel to the mobile unit via either the BSC or the base station based on the determination.

17. The apparatus of claim 16 further comprising means for determining whether the base station receiving the call setup request is sufficient to support reliable communication with the mobile unit and wherein the means for determining whether to utilize either a Base Station Controller or a base station for channel assignment comprises means for utilizing the base station for channel assignment when the base station receiving the call setup request is sufficient to support reliable communication with the mobile unit.

18. The apparatus of claim 16 wherein the means for receiving the type of call to be set up comprises means for receiving a request to set up a PTT call.

19. The apparatus of claim 16 wherein the means for receiving the type of call to be set up comprises means for receiving a request to set up a standard interconnect call.

20. The apparatus of claim 16 wherein the means for receiving the request comprises means for receiving one of an IS2000 Origination Message, an IS2000 Page Response Message, or an IS2000 Reconnect Message.

* * * * *